Nov. 15, 1955   H. F. DALGLISH   2,723,862

COMBINED TANK AND VAN TRAILER BODY

Filed June 30, 1951

INVENTOR
HERBERT F. DALGLISH
BY Robert M. Dunning
ATTORNEY

United States Patent Office 2,723,862
Patented Nov. 15, 1955

2,723,862

COMBINED TANK AND VAN TRAILER BODY

Herbert F. Dalglish, St. Paul, Minn., assignor to Duaload Transportation Corporation, St. Paul, Minn., a corporation of Minnesota Application June 30, 1951, Serial No. 234,559

4 Claims. (Cl. 280—5)

This invention relates to trucks or trailers and pertains more particularly to a combined tank and van type of vehicle.

In the interurban transportation of motor freight, it is frequently necessary for the truck to return empty, especially when the goods being hauled in one direction are different in nature from the load that is available for the return trip. For example, milk is frequently hauled from Indiana to Florida, and the tank-type truck or trailer must return empty to its home state, whereas a load of oranges or the like might be carried back if the truck or trailer were suitably designed. Another such instance would be where oil or gasoline is transported in one direction, and grain or other dry goods are available for the return trip. There are, of course, still other situations where a combined tank and van type of truck or trailer would have considerable utility.

Accordingly, it is one object of the invention to provide a multiple purpose trailer in which a fluid may be hauled in one direction and dry goods in the other. In this connection it will be appreciated that it is usually the axle load limit imposed by state law that usually determines the size of a trailer or truck which is designed to haul a given commodity, rather than any limitation on the physical dimensions by virtue of clearance restrictions. The foregoing is especially true where liquids having a rather high specific gravity are to be carried. Therefore, it will be understood that my trailer or truck may be designed to carry a liquid of such volume that the upper weight limit may be reached but not exceeded, yet leaving sufficient available space for a van compartment capable of accommodating a dry load of appreciable size.

Another purpose of the invention is to provide a vehicle of the foregoing character in which access may be had to the van compartment from one end or through the top.

A further purpose of the invention is to provide a combined tank and van in which the center of gravity of the tank compartment or compartments is maintained relatively low.

Another purpose of the invention is to divide the liquid containing section into two laterally positioned compartments, one on each side of the centrally disposed van compartment, with communication means therebetween to maintain lateral balance of the compartments when only partially filled.

A still further object of the invention is to provide an economical trailer of the described type that will be of sturdy and rigid construction.

These and other objects and advantages will be understood from the subjoined description with the aid of the attached drawing, in which.

Figure 1:
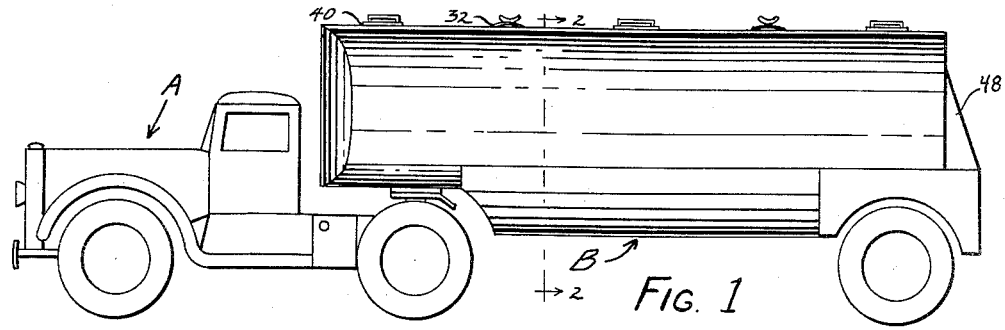
Figure 1 is an elevational view of a truck and trailer representing a suggested embodiment of the invention.
Figures 2, 3:
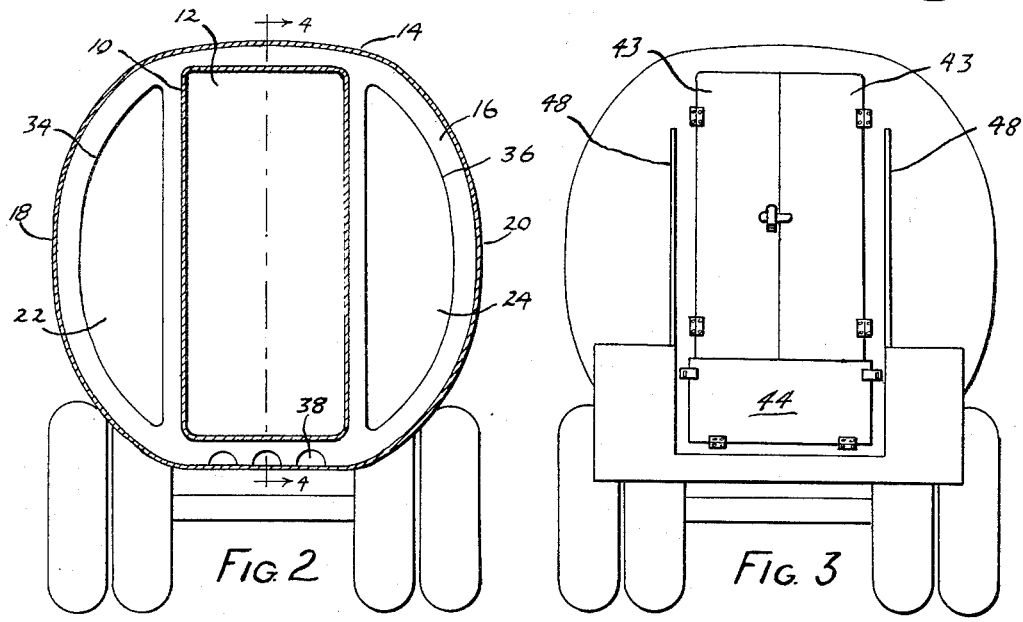
Figure 2 is a sectional view taken on the line 2—2 of Figure 1.
Figure 3 is a rear view of the trailer.

Referring now to the drawing, there is represented a truck A and a trailer B, although it will be appreciated that the invention is susceptible to incorporating the trailer portion as an integral part of the truck.

The trailer B comprises an inner shell 10, forming a van compartment 12 for the reception of dry goods, and an outer shell 14 maintained in spaced relation with the inner shell 10 by a plurality of transverse frame elements 16. It will be noted that the outer casing or shell 14 curves outwardly at either side 18 and 20 to define a pair of tank compartments 22 and 24 laterally disposed with respect to the central van compartment 12.

Figure 4:
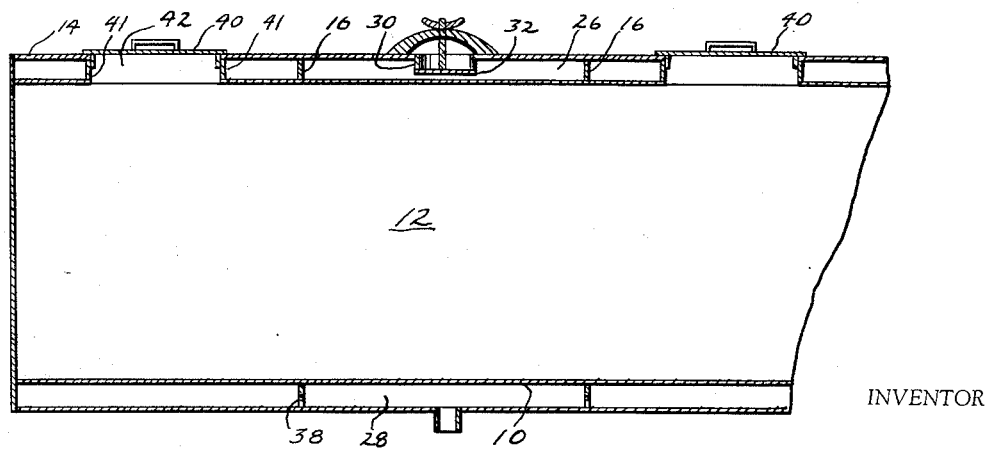
Figure 4 is a fragmentary sectional view of the trailer as viewed in general direction of line 4—4 of Figure 2.

The various frame elements 16 are preferably continuous across both the top and bottom to form a series of transversely extending communicating passages 26 and 28. It will be seen from Figure 4 that the upper connecting passage 26 affords a convenient space into which to introduce the liquid to be transported. Accordingly, a sleeve 30 is recessed into the space and may be suitably closed by a manhole cover 32 of conventional construction. The spacing frames 16 may be cut out at 34, 36 and 38 to provide complete longitudinal communication throughout the length of the trailer B, if desired, or they may be alternately left imperforate to provide sectionalized tank compartments.

In order to render the van compartment 12 as suitable as possible for the carrying of different types of dry freight, a series of hatches 40 may be provided along the top of the trailer B, a plurality of vertical strips 41 forming the hatch openings 42 leading through the outer and inner shells 14 and 10. These hatches 40 render the trailer suitable for the carrying of fungible goods, such as grain. A pair of hinged doors 43 and a tail gate 44 are positioned at the rear of the van compartment 12 to provide facile loading of bulk goods. Also, at the rear of the trailer I preferably weld in place a pair of gussets 48, although if desired the gussets may be dispensed with.

In conclusion, it is thought apparent that I have illustrated a trailer design that lends itself readily to welded or riveted fabrication throughout, and that the trailer may be constructed entirely of sheet metal without the use of any interfering strut elements within the van compartment 12. It is also believed apparent that the unit may be proportioned in a manner to best serve the industry or industries for which freight is to be hauled.

In accordance with the patent statutes, I have described the principles of construction and operation of my highway trailer, and while I have endeavored to set forth the best embodiment thereof, I desire to have it understood that obvious changes may be made within the scope of the following claims without departing from the spirit of my invention.

I claim:

1. In combination a motor vehicle cargo tank and cargo van comprising an elongated outer fluid compartmental container shell forming the sides of the vehicle body, a central rectangular inner van compartment container shell in spaced relation to said outer shell forming a lining therefor, said lining extending the length thereof and having an opening in one end, integral forward and back end closure walls connecting said outer shell and said inner rectangular shell, said outer shell, said rectangular inner shell and said integral end closure walls providing elongated laterally positioned liquid compartments extending along each side of the centrally disposed rectangular van compartment, liquid communication means between said liquid compartments to maintain lateral balance therebetween when only partly filled, a plurality of transverse frame elements at regularly spaced intervals between said shells, and said outer shell having filling openings respectively into the space between said shells and through said inner and outer shells and into said centrally disposed van compartment, whereby fluid cargoes and solid cargoes are loaded separately for simultaneous and independent motor vehicle transportation.

2. The structure of claim 1, including the outer shell being of substantially equal vertical and horizontal dimensions, a door closure means for said opening in one end and a plurality of filling openings in and through said shells.

3. In combination a motor vehicle van for separately, independently and simultaneously transporting liquid cargoes and dry cargoes in a pair of liquid tanks and a centrally disposed van compartment the structure comprising an outer elongated liquid container shell forming the outer body of said vehicle van closed at both ends and provided with an opening intermediate the closed portions at one end, an inner substantially rectangular compartment forming shell in spaced relation to said outer shell generally defined in cross-sectional area by said opening, said outer shell, said inner shell and the closed ends thereof forming elongated liquid tanks extending along each side of the said inner substantially rectangular shell, liquid communicating means between said tanks to maintain lateral balance therebetween when only partly filled, a plurality of transverse spacing frame means spaced at intermediate positions between said shells, said frame means having a peripheral edge corresponding to the cross-sectional configuration of said outer shell and an inner edge corresponding to the cross-sectional substantially rectangular configuration of said inner shell, and said outer shell having filling openings leading respectively into the said elongated liquid tanks and into said centrally disposed van compartment, whereby liquid cargoes are separately stored in the liquid tanks and dry cargoes are separately stored in the inner compartment forming shell.

4. A combined tank and van including spaced inner and outer shells, the outer shell being sealed at its ends to said inner shell, the inner shell being of rectangular cross-section to provide standing heighth therein and having an open end and a closed end, closure means closing said open end, shaped frame means holding said shells in spaced relation, said outer shell being extended outwardly from said inner shell along opposite sides to provide laterally spaced tank compartments, connecting means between said tank compartments to maintain lateral balance therebetween when only partly filled, a series of longitudinally spaced filling openings along the top of said outer tank above said inner shell, and a series of longitudinally spaced filling openings extending through both shells and sealed with respect thereto to provide access to the inner shell from the top thereof.

References Cited in the file of this patent

UNITED STATES PATENTS

| 308,948 | Bruce | Dec. 9, 1884 |
| 583,660 | Rogers | June 1, 1897 |
| 729,653 | Parham | June 2, 1903 |
| 731,672 | Eberlein | June 23, 1903 |
| 1,235,128 | Frank | July 31, 1917 |

FOREIGN PATENTS

| 749,022 | France | May 2, 1933 |
| 795,123 | France | Dec. 26, 1935 |